United States Patent [19]

Tremblay

[11] Patent Number: 4,575,112
[45] Date of Patent: Mar. 11, 1986

[54] MECHANIZED HITCH FOR TRACTOR OR THE LIKE

[76] Inventor: Jacques I. Tremblay, 952, Ile Rang, Roxton Falls, Quebec, Canada, J0H 1E0

[21] Appl. No.: 604,175

[22] Filed: Apr. 26, 1984

[30] Foreign Application Priority Data

Jan. 20, 1984 [CA] Canada .................................. 445803

[51] Int. Cl.⁴ ............................................. B60D 1/04
[52] U.S. Cl. ............................ 280/479 A; 294/82.24; 414/729; 901/37
[58] Field of Search .......... 280/479 R, 479 A, 478 R, 280/478 A, 478 B, 477, 482, 504; 901/37; 414/730, 729; 294/83 R, 82.24

[56] References Cited

U.S. PATENT DOCUMENTS

| | | | |
|---|---|---|---|
| 3,489,432 | 1/1970 | Karlstrom | 280/504 |
| 3,649,048 | 3/1972 | Garnett | 280/477 |
| 3,774,943 | 11/1973 | Schmiesing | 280/479 |
| 4,133,552 | 1/1979 | Sheine | 280/446 B |
| 4,148,497 | 4/1979 | Genty | 280/479 A |
| 4,288,091 | 9/1981 | Umeda et al. | 280/415 A |
| 4,368,899 | 1/1983 | Smalley et al. | 280/477 |

Primary Examiner—John A. Pekar

[57] ABSTRACT

A mechanized hitch comprising a telescopic device including a first and a second hollow lever slidable one into the other between a nested position and an extended position, the free end of the first lever being connected to a stationary bracket for pivotal movement of the device in a plane between an upright position wherein the levers are in the nested position and an inclined position wherein the levers are in the extended position. A hook is mounted at the free end of the second lever to allow pivotal movement thereof in a plane perpendicular to the pivot plane of the device between a hooking position in which the hook lies in the pivot plane and a release position in which the hook lies outside the pivot plane, and a jack housed within the telescopic device and pivotally mounted at one of its ends to the bracket while being likewise pivotally mounted at the other of its ends to the hook to pivot the said hook.

13 Claims, 4 Drawing Figures

MECHANIZED HITCH FOR TRACTOR OR THE LIKE

The present invention relates to a mechanized hitch which is secured at the end of a tractor and which is intended to be connected, in removable manner, to a vehicle which is to be drawn by the tractor.

The main object of the invention is to allow coupling, by a single man, of the tractor to the vehicle to be drawn by means of a hitch mechanism and without the necessity of the man leaving his driving seat on the tractor, the invention being particularly interesting in that it proposes the use of a mechanism which is of great simplicity, can be manufactured at low cost and of which the coupling operation offers no difficulty.

Mechanisms of this type are already known from the following U.S. Pat. Nos.: 3,489,432 of 1970; 3,649,048 of 1972; 4,133,552 of 1979; 4,148,497 of 1979; 4,288,091 of 1981; 4,368,899 of 1983. However, none of the devices disclosed in these patents is as simple to make and operate as the mechanism of the present invention which is based on the use of a telescopic device tiltable in a vertical plane and provided, at one end, with a hook displaceable in a lateral plane, that is perpendicular to the tilting plane of the telescopic device. Furthermore, the mechanism according to the invention only requires a single hydraulic or pneumatic cylinder or jack. It is thus possible, as will further be described hereinafter, to elongate the mechanism which is secured to a tractor so that its hook be disposed close to and above the ring or the like of the traction bar of the vehicle to be drawn, then lower the mechanism and, by lateral movement of the hook, insert it into the draw ring.

More specifically, the invention claimed herein in broad terms is a mechanized hitch comprising: a stationary bracket; a telescopic device including a first and a second hollow lever slidable one into the other between a nested position and an extended position, each lever having a free end; means mounting the free end of said first lever on said bracket for pivotal movement of said telescopic device in a plane, between an upright position of said device wherein said levers are in said nested position and an inclined position of said telescopic device wherein said levers are in said extended position; a hook; means mounting said hook at the free end of said second lever for pivotal movement of said hook in a plane perpendicular to said pivot plane of said telescopic device between a hooking position in which said hook lies essentially in said pivot plane and a release position in which said hook lies essentially outside of said pivot plane; a jack housed within said telescopic device and pivotally mounted at one of its ends to said bracket and pivotably mounted, at the other of its ends, to said hook to pivot said hook; said jack, in retracted position thereof, holding said telescopic device in said upright position and, in elongated position thereof, holding said telescopic device in said inclined position and said hook in said release position.

A description is given, hereinafter, of a preferential embodiment of the invention, the description having reference to the appended drawing wherein.

Figure 1:
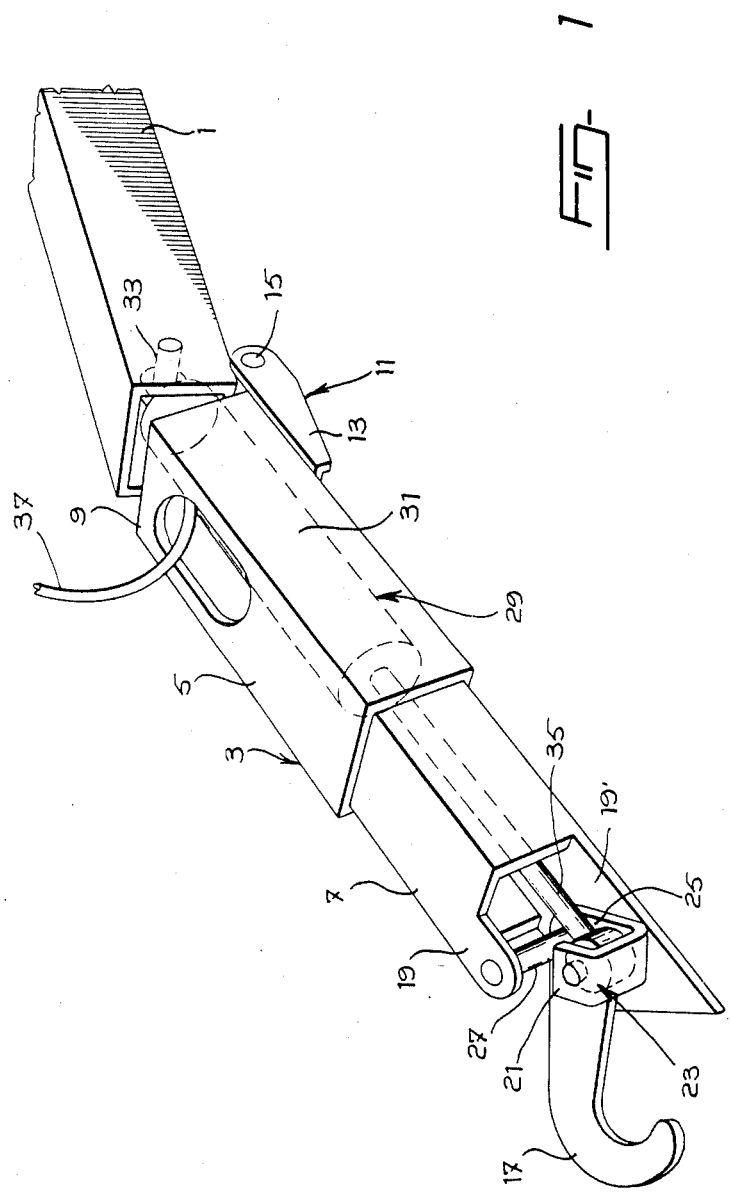
FIG. 1 is a perspective view of a mechanized hitch made according to the teaching of the present invention.
Figure 2:
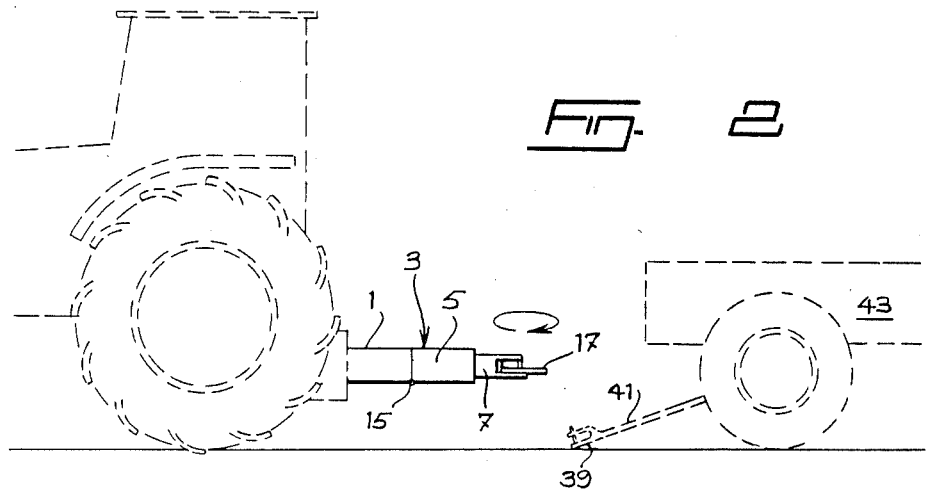
FIGS. 2, 3 and 4 are side elevation views illustrating the mechanized hitch, mounted on a tractor, in three successive operating positions.
Figure 3:
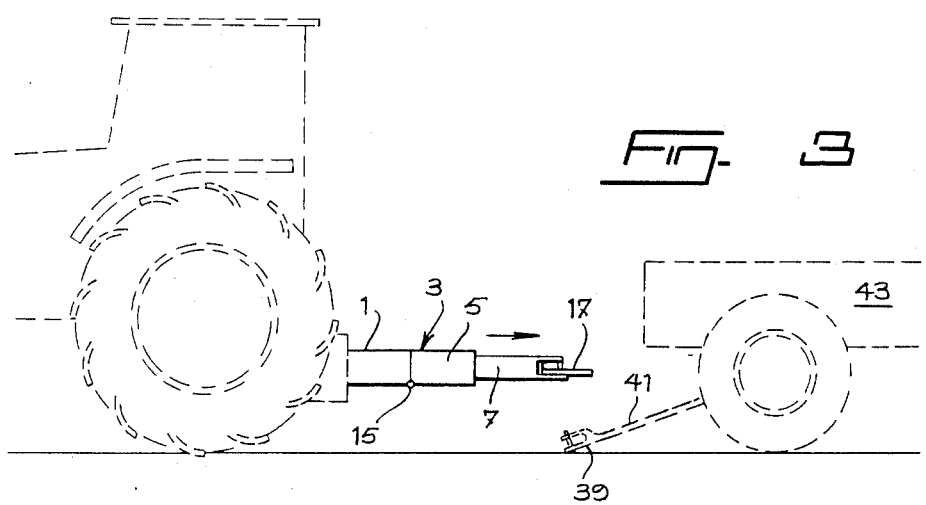
Figure 4:
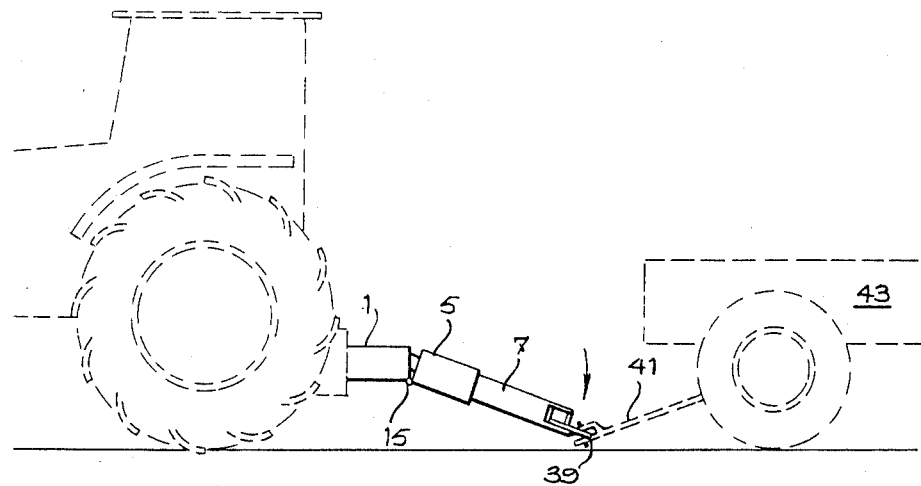

The mechanized hitch shown in FIG. 1 comprises a stationary bracket 1 and a telescopic connecting device 3 made up of a first hollow lever 5 followed by a second hollow lever 7 slidable one into the other and thus between a nested position (FIG. 2) and an extended position (FIGS. 3 and 4). The free end 9 of the first lever is pivotally mounted on the stationary bracket 1 by means of a hinge 11 of known type of which a first part 13 is secured, by welding or otherwise, beneath the first lever 5 and the second component 15 (the pivot axle) is secured beneath the stationary bracket 1 in any adequate manner. As can easily be seen, these means make it possible for the telescopic device 3 to pivot, in a vertical plane, between two extreme positions. A first position is the upright position wherein the two levers 5 and 7 are nested one into the other, as shown in FIG. 2, and the free end of the first lever 5 comes to face the stationary bracket 1, more particularly butting against the bracket 1. The second position is the position of FIGS. 1 and 4 where the levers 5 and 7 are in extended position in respect to one another.

The stationary bracket 1 and the levers 5 and 7 are rectangular tubes but could obviously be of other shapes, particularly circular.

The free end of the second lever 7 has two opposed faces 19, 19', which extend beyond the other two faces. A hook 17 is mounted between these two faces, being fixed on a short leg 21 of a U-shaped support 23 of which the other leg 25, longer than the leg 21, is fixed at the lower end of an axle 27 pivotally mounted on the extended faces 19, 19'. This axle 27 is located away from the common axis of the telescopic levers 5 and 7.

As particularly illustrated in FIG. 1, a fluid-pressure-operated jack 29 (hyrdaulic of pneumatic) is housed within the telescopic device 3, that is within the levers 5 and 7. The cylinder 31 of this jack 29 is pivotally mounted, at one of its ends, on an axle 33 mounted transversely of the stationary bracket 1. As to the rod 35 of the jack 21, it is pivotally mounted at its free end on the support 23 between the legs 21 and 25.

The cylinder 31 of the jack 29 is obviously fed with hydraulic or pneumatic fluid through a suitable piping illustrated symbolically at 37 in FIG. 1.

The operation of the mechanized hitch above described now follows with particular reference to FIGS. 2, 3 and 4

In FIG. 2, the levers 5 and 7 of the device 3 are in nested position and the hook 17 is in hooking position, that is essentially in the pivot plane of the device 3.

When the jack 29 is put under pressure, the rod 35 first pivots the hook 17 in a plane which is perpendicular to the pivot plane of the device 3, along the arcuate arrow of FIG. 2, and thus brings the hook 17 in release position as illustrated in FIG. 1. This work of least resistance being accomplished and the jack 29 being always under the effect of the fluid pressure, the rod 35 pushes the second lever 7 outwardly of the first lever 5 which is the situation illustrated by the straight arrow of FIG. 3. Finally, at the end of its stroke, the rod 35 forces the telescopic device 3 to pivot about the axle 15 in a vertical plane which, as aforesaid, is perpendicular to the pivot plane of the hook 17 (see FIG. 4). To avoid that this pivot movement take place before the other required movements, the axle 15 may be provided with a brake or another appropriate clamping device such as those used currently in a clutching device. When the tip of the C-shaped hook 17 faces the opening in the ring 39 (or equivalent device) of the traction bar 41 of the trailer 43, the jack is operated in reverse. The hook 17 then pivots in a direction reverse that shown by the arrow of FIG. 2 and moves into the ring 39, the rod 35 of the jack 29 then brings the lever 7 into the lever 5 while causing straightening of the telescopic device 3 to bring it back into the position of FIG. 2 but this time with the traction bar 41 adequately engaged.

In order to provide appropriate locking of the hook 17 in the ring 39 or equivalent, the end of the face 19' of the second lever 7 could be pointed, as illustrated in FIG. 1, which would serve as a latch to close the opening defined by the curved portion of the hook 17.

I claim:

1. A mechanized hitch comprising:
   a stationary bracket;
   a telescopic device including a first and a second hollow lever slidable one into the other between a nested position and an extended position, each lever having a free end;
   means mounting the free end of said first lever on said bracket for pivotal movement of said telescopic device in a plane between an upright position and an inclined position;
   a hook;
   means mounting said hook at the free end of said second lever for pivotal movement of said hook in a plane perpendicular to said pivot plane of said telescopic device between a hooking position in which said hook lies essentially in said pivot plane and a release position in which said hook lies essentially outside of said pivot plane;
   a jack housed within said telescopic device and pivotally mounted at one of its ends to said bracket and pivotally mounted, at the other of its ends, to said hook to pivot said hook; said jack, in retracted position thereof, holding said telescopic device in said upright position with the levers of said device in said nested position and, in elongated position thereof, holding said telescopic device in said inclined position with the levers of said device in said extended position and with said hook in said release position.

2. A hitch according to claim 1, wherein said levers slide along a common axis and said hook pivot means comprise:
   a support having a first end to which a straight end of said hook is mounted and means mounting a second end of said support to said free end of said second lever for pivotal movement of said support about an axis parallel to said pivot plane of said telescopic device, said other end of said jack being pivoted to said first end of said support;
   whereby elongation and retraction of said jack cause pivotal movement of said hook between said hooking and release positions.

3. A hitch according to claim 2, in which the free end of said second lever is rectangular in shape with two opposed faces extending beyond the remaining two opposed faces; said hook pivot means being disposed between said two extending faces and being mounted thereon.

4. A hitch according to claim 3, wherein one of said two extending faces is pointed and serves as a latch to close the opening defined by the curved part of said hook, in hooking position thereof.

5. A hitch according to claim 3, wherein said first end of said support is U-shaped within which said hook is mounted and said second end of said support is an extension of one arm of said U.

6. A hitch according to claim 5, additionally comprising an axle mounted on said two extending opposed faces of said second lever, the said second end of said support being connected to said axle for pivoting said support, said axle being part of said means mounting said second end of said support for pivotal movement at the free end of said second lever.

7. A hitch according to claim 1, wherein said stationary bracket and said levers are hollow rectangular tubes; the said means mounting the free end of said first lever to said bracket comprising a hinge having two interpivoted parts each respectively secured to two adjacent faces of said first lever and of said bracket.

8. A hitch according to claim 7, wherein the pivot axis of said hinge is parallel to the pivot axis of the end of said jack mounted on said stationary bracket.

9. A hitch according to claim 1, wherein said bracket is a hollow rectangular tube for mounting onto a tractor and said hook has a curved free end for insertion into a draw ring provided at the end of a traction bar of a vehicle to be drawn by said tractor.

10. A mechanized hitch comprising:
    a stationary bracket;
    a telescopic device including a first and a second hollow lever slidable one into the other between a nested position and an extended position, each lever having a free end;
    means mounting the free end of said first lever on said bracket for pivotal movement of said telescopic device between an upright position and an inclined position;
    a hook;
    means mounting said hook at the free end of said second lever for pivotal movement of said hook between a hooking position and a release position; and
    a jack pivotably mounted at one of its ends to said bracket and pivotably mounted, at the other of its ends, to said hook to pivot said hook to said hooking position; said jack, in retracted position thereof, holding said telescopic device in said upright position with the levers of said device in said nested position and, in elongated position thereof, holding said telescopic device in said inclined position with the levers of said device in said extended position and with said hook in said release position.

11. A hitch according to claim 10, wherein said levers slide along a common axis and said hook pivot means comprise:
    a support having a first end to which a straight end of said hook is mounted and means mounting a second end of said support to said free end of said second lever for pivotal movement of said support about an axis, said other end of said jack being pivoted to said first end of said support;
    whereby elongation and retraction of said jack cause pivotal movement of said hook between said hooking and release positions.

12. A hitch according to claim 11, in which the free end of said second lever is rectangular in shape with two opposed faces extending beyond the remaining two opposed faces; said hook pivot means being disposed between said two extending faces and being mounted thereon.

13. A hitch according to claim 12, wherein said stationary bracket and said levers are hollow rectangular tubes; the said means mounting the free end of said first lever to said bracket comprising a hinge having two interpivoted parts each respectively secured to two adjacent faces of said first lever and of said bracket.

* * * * *